United States Patent
Paxman (12)

(10) Patent No.: US 6,382,865 B1
(45) Date of Patent: May 7, 2002

(54) BASE-MOUNTED LUBRICATED BALL JOINT

(76) Inventor: Richard C. Paxman, 16126 Cantlay St., Van Nuys, CA (US) 91406

( * ) Notice: Subject to any disclaimer, the term of this patent is extended or adjusted under 35 U.S.C. 154(b) by 0 days.

(21) Appl. No.: 09/336,560

(22) Filed: Jun. 21, 1999

(51) Int. Cl.$^7$ ................................................ F16C 11/00
(52) U.S. Cl. ...................... 403/131; 403/128; 403/139; 403/142
(58) Field of Search ................................ 403/131, 122, 403/130, 128, 135, 139, 141, 142, 143, 134

(56) References Cited

U.S. PATENT DOCUMENTS

| | | | |
|---|---|---|---|
| 2,954,993 A | * 10/1960 | Scheublein, Jr. | ......... 403/134 X |
| 3,850,443 A | 11/1974 | Hassan | |
| 4,003,667 A | * 1/1977 | Gaines et al. | ............ 403/134 X |
| 4,034,996 A | 7/1977 | Manita, et al. | |
| 4,069,864 A | * 1/1978 | Novoryta et al. | ........ 403/143 X |
| 4,256,413 A | 3/1981 | Abe | |
| 4,617,430 A | 10/1986 | Bryant | |
| 5,009,538 A | * 4/1991 | Shirai et al. | ................. 403/134 |
| 5,069,433 A | 12/1991 | Womack | |
| 5,201,445 A | 4/1993 | Axelman | |
| 5,509,478 A | 4/1996 | Idosako, et al. | |
| 5,518,370 A | 5/1996 | Wang, et al. | |
| 5,672,023 A | 9/1997 | Lieber, et al. | |
| 5,704,578 A | 1/1998 | Fischer | |
| 5,799,968 A | * 9/1998 | Loeffler | ................... 403/143 X |
| 6,030,141 A | * 2/2000 | Lieber et al. | ................ 403/135 |

OTHER PUBLICATIONS

A copy of p. 623 of the McMaster–Carr hardware catalog 97 which explains "Self–tapping fittings have tapered drive threads for installation in untapped holes".

* cited by examiner

*Primary Examiner*—Lynne H. Browne
*Assistant Examiner*—John R. Cottingham
(74) *Attorney, Agent, or Firm*—Albert O. Cota

(57) ABSTRACT

A base mounted lubricated ball joint utilizing a hollow socket case (20) is attached to an automobile axle or other workpiece by welding or bolting. A ball (42) is disposed within a socket (28) contained within the case and rotates freely within. A socket cap (52) is attached to the case leaving an upper portion of the ball (42) exposed, thereby permitting orbiting of the ball (42) upon its rotational axis limited only by its geometrical configuration. To utilize the invention, a shaft, a hydraulic cylinder, a table leg or a heavy machinery coupling is attached to the ball by threads. The ball joint is lubricated with grease through a grease fitting, which penetrate the joint and is distributed through grooves (36) located in both the ball and the case.

9 Claims, 3 Drawing Sheets

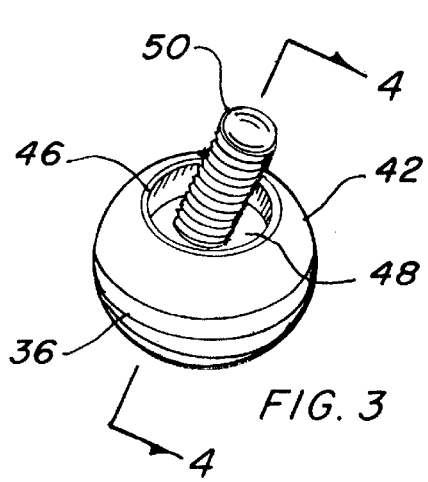
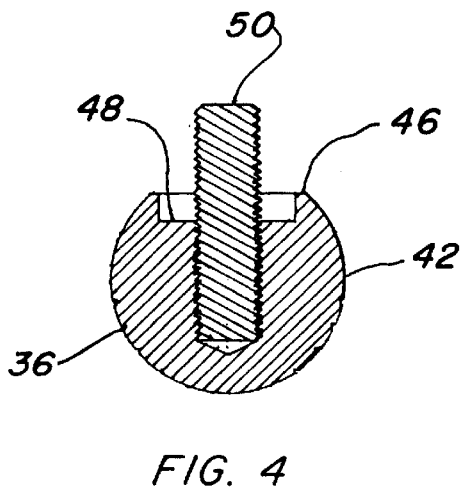
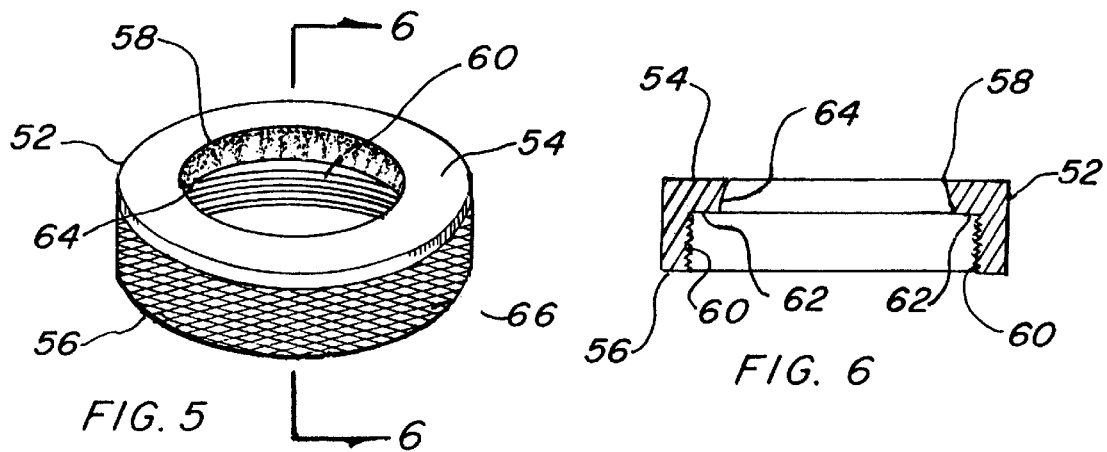
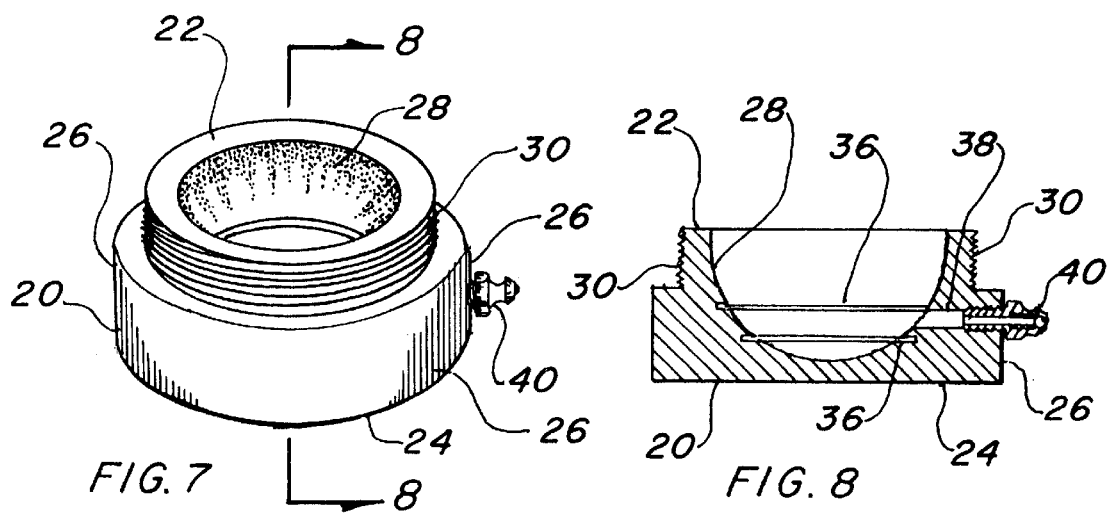

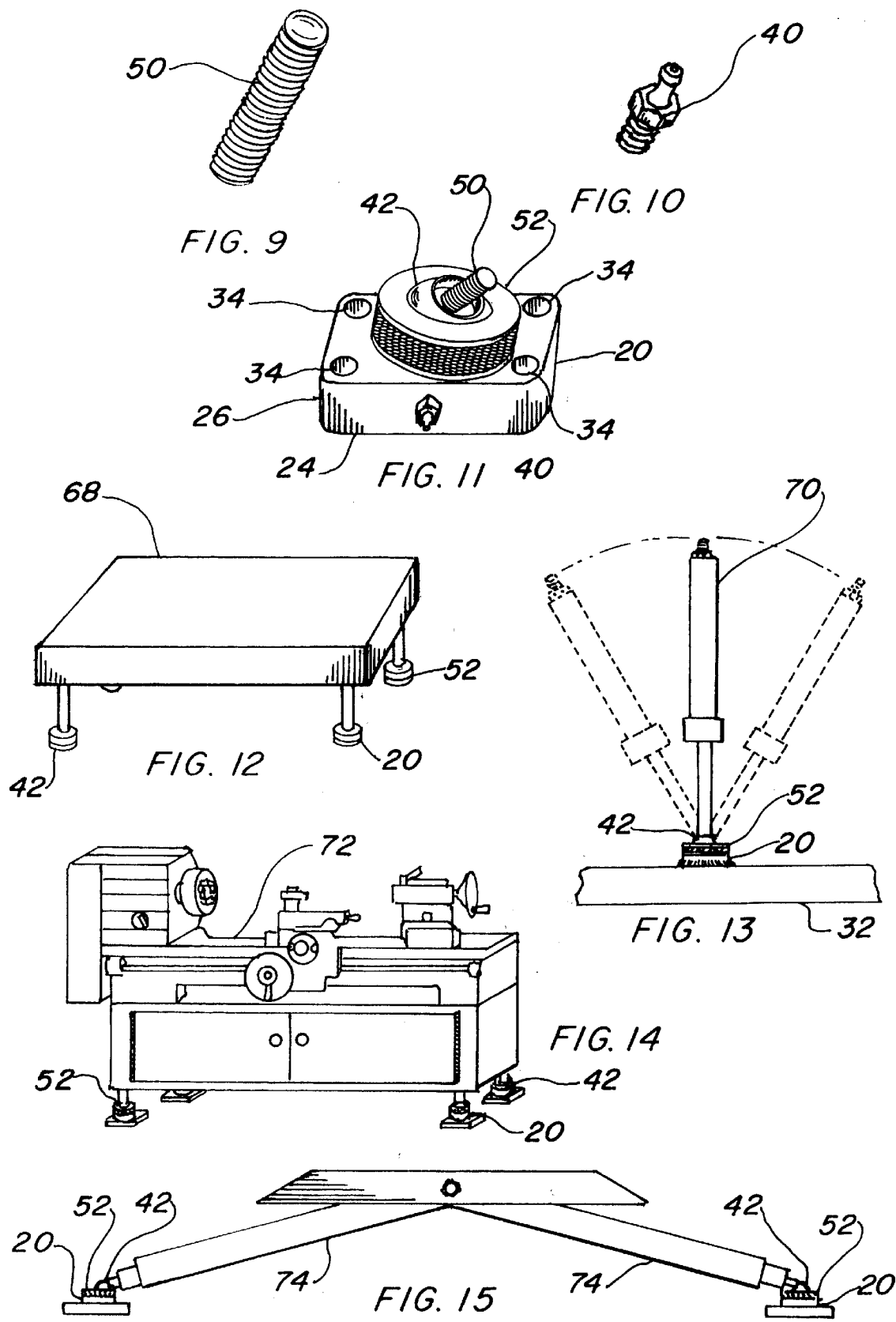

BASE-MOUNTED LUBRICATED BALL JOINT

TECHNICAL FIELD

The present invention relates to ball joints in general, and more specifically, to a ball joint with a base mount having lubrication means therebetween.

BACKGROUND ART

Previously, many different types of ball joints have been used to provide an effective means for transferring energy while simultaneously permitting pivoting of the joint. Conventional ball joints have been in use for many decades, primarily in automotive and large over-the-road equipment, but also in smaller applications where limited movement is required in an angular axis. Lubrication of ball joints has been accomplished using a variety of methods including grease, oil, resilient low-friction substances and the like.

Lieber, et al in U.S. Pat. No. 5,672,023 teaches a ball joint with a socket and a shell that supports the ball. A spring element supporting an underside of a cover that closes the ball joint socket and provides a constant resilient force upon the ball to compensate for the wear-related elasticity of the ball until a defined wear is reached after assembly. The spring element is supported in the center of the cover by spring tabs that point toward the center and transform into a cylindrical center part in the shape of a ball race.

U.S. Pat. No. 5,509,478 of Idosako, et al is for a ball joint that compensates for manufacturing tolerances of the components, and functions under large loads. A rigid bearing seat has an elastic restoring force that compensates for tolerances under variable loads. The housing and seat permit incremental increases in areas, thereby tolerating larger loads without deformation of the bearing seat.

U.S. Pat. No. 5,069,433 issued to Womack discloses a swivel ball mounted in a clampable base having a pair of split socket members that are forced together by the jaws of a vice.

Bryant in U.S. Pat. No. 4,617,430 teaches a swivel mounting base with a locking screw that permits locking a mounting surface in a desired position relative to the base. The mounting surface is adapted to permit attachment of a device on the dash board of a vehicle.

U.S. Pat. No. 4,256,413 issued to Abe is for a ball joint mounted in one or two structural members that are joined together by the ball. The mounting structure is self-chalking by means of a hollow cylindrical housing of the ball joint and a cylindrical portion of one of the structural members. As the housing is press fitted into the cylindrical portion of at least one of the members, the member plastically deforms to firmly secure the ball in a single member.

Manita, et al disclose in U.S. Pat. No. 4,034,996 a ball joint used in a torque rod of an automobile. No lubrication is required as the ball is mounted into brackets that are utilized in conjunction with a bearing ring made of a synthetic resin. The resin is sufficiently resilient to support a shaft that includes a balls on the ends. Oil containing fabrics are provided on both sides of the bearing ring adhering into the periphery of the ball.

U.S. Pat. No. 3,850,443 issued to Hassan is for a ball joint suspension apparatus that has an upper and lower control arm connected by ball joints to a steering knuckle. One ball joint has a stud with a ball on one end mounted within a socket. A pressure plate is backed by a separate washer which is biased by a resilient member. The plate engages the ball and maintains contact with the socket for wear. A retainer is located in the socket, thereby limiting the amount of movement of the separate washer.

DISCLOSURE OF THE INVENTION

In the past ball joints have been used in a multitude of applications, however in most cases the joint is rather fragile and sometimes delicate as their use has been in areas where ultimate strength has not been the governing factor. Therefore, the primary object of the invention is directed to a machined two-piece movable joint with a solid metallic ball that is rugged and durable. This construction utilizes two separate pieces formed as a socket case and a cap, each machined from a solid block of steel and screwed together with the ball captivated therein. This type of construction provides a movable joint that is extremely strong and able to withstand a considerable weight load, even when subjected to external shock and vibration, thus overcoming the difficulties of the prior art.

An important object of the invention is the method of lubrication which makes use of grooves in both the ball and socket and a conventional grease fitting that provides a direct passageway to a diminutive region between the ball and socket. This design utilizes a well known process using conventional grease pumping equipment.

Another object of the invention is the ease of attachment to the item used with the ball joint. For heavy duty use welding is preferred, thereby permitting the socket case to be relatively small. The socket case may also be machined from a rectangular or square block of material and have holes for attachment with conventional bolts. If the application requires a larger footprint, a plate may be easily welded onto the bottom of the case. In automotive applications using hydraulic cylinders, the case may be welded directly to an axle for a simple yet rugged interface.

Still another object of the invention is the ease in which the ball may be removed for replacement or refurbishment. The case, being made in two pieces, is easily dissembled by screwing the cap off and lifting the ball from the socket. The ball is also easily removed as it is attached with threads to the shaft or cylinder.

Yet another object of the invention is its universal usage. While its primary function is directed to automotive hydraulic suspension systems or so-called "low-rider" systems, where the ball joint is welded to the axle of a car and the ball is attached to a hydraulic cylinder, a multitude of other applications are equally well-suited to its function. For example, load leveling may be accomplished in uneven terrain using a mounting pad welded to the case and the ball joint attached to the outriggers of a large capacity crane or similar vehicle requiring extended mounting feet under heavy weight loading. Floating tables, such as portable stages, platforms, bleachers and the like require some type of pivot joint to achieve the necessary leveling, therefore the invention fills this need where a robust joint is required. Large machine tools such as lathes, milling machines, punch presses, brakes, etc. may also require joints for leveling on uneven concrete floors. Other uses include motion control tables, such as these employed in flight simulators where hydraulic cylinders continuously change orientation and considerable weight is involved. It may also be noted that any appliance requiring extremely strong pivot joints is easily included in the utility of the invention.

These and other objects and advantage of the present invention will become apparent form the subsequent detailed description of the preferred embodiment and the appended claims taken in conjunction with the accompanying drawings.

BRIEF DESCRIPTION OF THE DRAWINGS

FIG. 3 is a partial isometric view of the ball completely removed from the invention for clarity and a stud disposed within a threaded bore in the ball for attachment.

FIG. 4 is a cross sectional view taken along lines 4—4 of FIG. 3.

FIG. 5 is a partial isometric view of the socket cap completely removed from the invention for clarity.

FIG. 6 is a cross sectional view taken along lines 6—6 of FIG. 5.

FIG. 7 is a partial isometric view of the socket case with a grease fitting attached, completely removed from the invention for clarity.

FIG. 8 is a cross sectional view taken along lines 8—8 of FIG. 7 rotated counterclockwise 90 degrees.

FIG. 9 is a partial isometric view of the threaded stud completely removed from the invention for clarity.

FIG. 10 is a partial isometric view of the threaded standard drive grease fitting completely removed from the invention for clarity.

FIG. 11 is a partial isometric view of an embodiment of the socket case in a rectangular configuration with four mounting holes therethrough.

FIG. 12 is a partial isometric view of a worktable with the invention attached to a floating table, such as a portable stage, mounted on an irregular surface.

FIG. 13 is a partial isometric view of the preferred embodiment welded to the axle of a vehicle, and a hydraulic cylinder attached to the stud with its piston disposed within the recess of the ball. The cylinder movement potential is shown in broken lines.

FIG. 14 is a partial isometric view of four of the ball joints attached to a machine tool, such as a lathe.

FIG. 15 is a partial isometric view of a typical ball joint attached to the outrigger legs of a vehicle, such as a crane or backhoe.

BEST MODE FOR CARRYING OUT THE INVENTION

Figure 1:
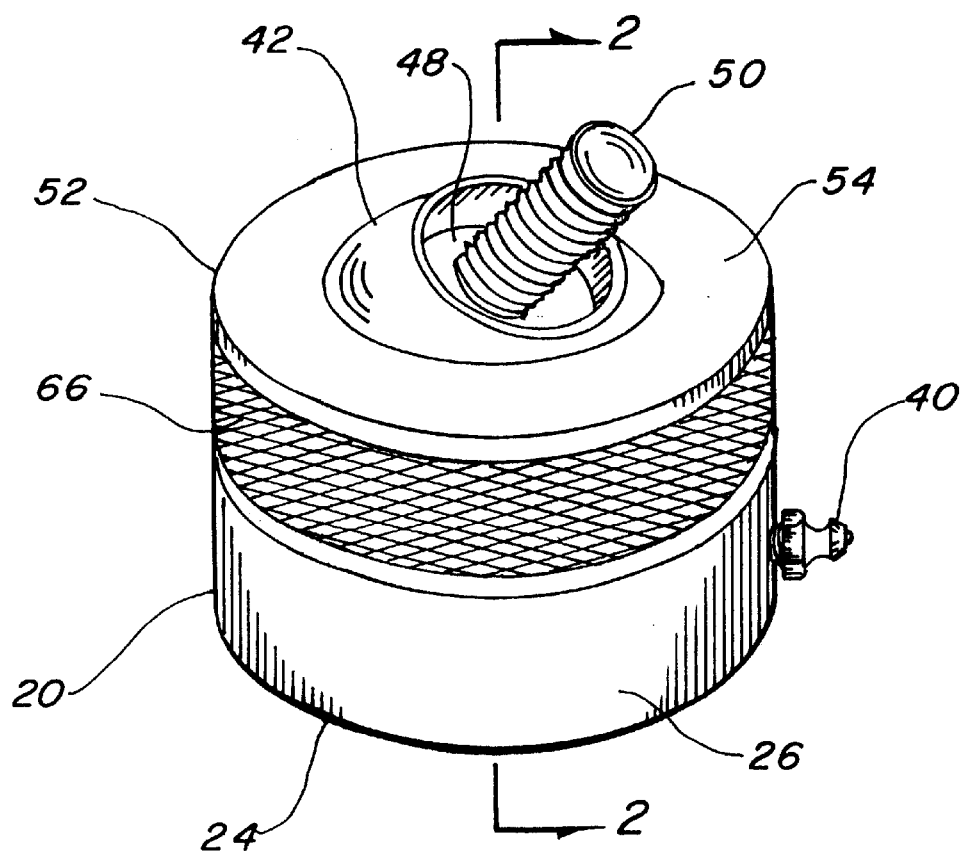
FIG. 1 is a partial isometric view of the preferred embodiment for the bas-mounted lubricated ball joint.
Figure 2:
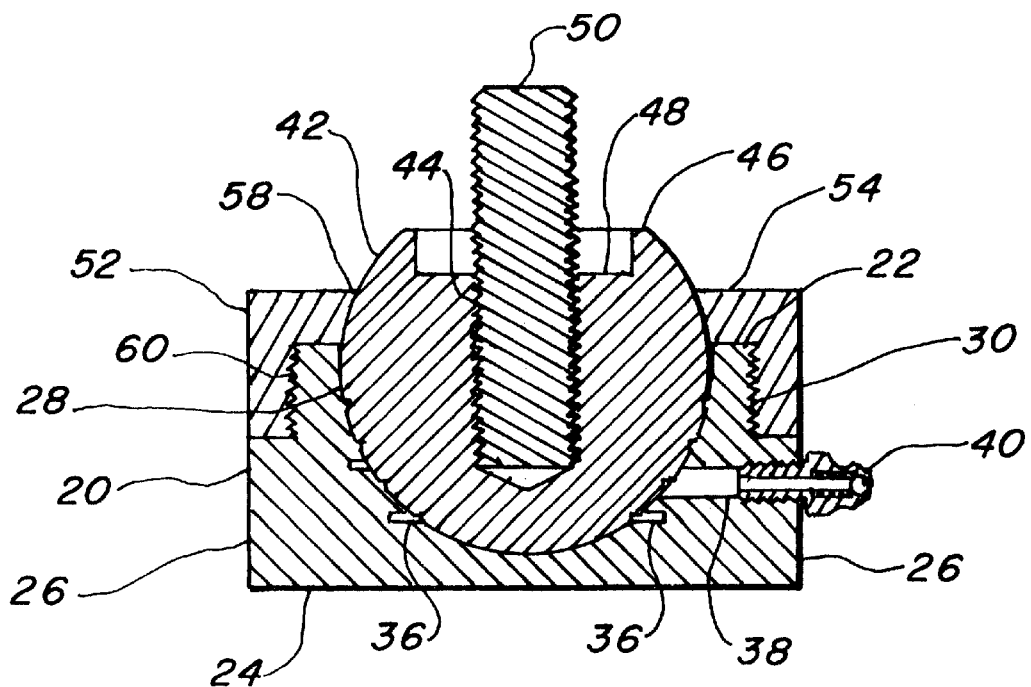
FIG. 2 is a cross sectional view taken along lines 1—1 of FIG. 1 with the ball rotated vertically.

The best mode for carrying out the invention is presented in terms of a preferred embodiment for a bas-mounted lubricated ball joint. The preferred embodiment, as shown in FIGS. 1 through 15, is comprised of a hollow socket case 20 that is preferably fabricated of machined metal, as illustrated in FIGS. 7 and 8. The case 20 has a top 22, bottom 24, and sides 26 and contains a spherical socket 28 that is integrally formed within the case. The case socket 28 is radial and includes a slight cylindrical portion located just above the centerline, as illustrated best in FIG. 2. The case 20 further has a number of radial male threads 30 that are cut into the side 26 at right angles to the top 22 at a diameter somewhat smaller than the outside surface of the case 20, as depicted in FIGS. 2, 7 and 8. The case 20 is preferably round on the sides 26, as shown in FIGS. 1, 2, 7 and 8, and may be attached by welding to a workpiece such as an automobile axle 32 are depicted in FIG. 13.

FIG. 11 illustrates another embodiment of the outside of the case 20 where the case 20 is in a rectangular shape and includes a number of mounting holes 34 that penetrate completely through the case 20 for attachment with conventional fasteners, such as nuts and bolts. Further, these mounting holes 34 may be threaded (not shown), thus eliminating the need for separate nuts. It should be noted that the holes 34 need not penetrate the entire case 20, but may be tapped, and even included in the round case configuration with equal ease since the external shape of the socket case 20 may be altered to any convenient shape and still fall within the scope of the invention.

For lubrication purposes the case socket 28 includes a plurality of grooves 36 which are recessed in the lower portion of the socket 28 as shown in FIGS. 2, 7 and 8. An orifice 38 penetrates the case 20 and is in alignment with one of the grooves 36, thereby providing a path for the admittance of lubricating grease. Any number of grooves 36 may be utilized and their location is optional within the case socket 28. The orifice 38 may include a dry seal tapered thread, for connection of a threaded standard drive-type grease fitting 40, or it may be left plain for insertion of a self-tapping spin drive-type grease fitting 40. The drawings are intended to depict both types of fittings since they are substantially identical in appearance.

A ball 42 having integral attachment means is rotatably disposed within the spherical socket 28 of the case 20, with the ball 42 protruding above the case 20 from 10 to 20 percent of the ball's radius. The ball 42 is illustrated separately in FIGS. 3 and 4, and assembled into the case in FIGS. 1 and 2. The ball 42 is preferably machined of metal and is basically round with a female threaded bore 44 located in a central position within the ball, as illustrated in FIGS. 2 and 4. The top surface of the ball 42 is machined into a flat portion 46 that is adjacent to, and at right angles to the threaded bore 44.

A recess 48 is machined into the flat portion 46, thus creating a hollowed cavity into which a shaft, or the like, may be received. The recess 48 augments the strength of the joint when a shaft having male threads is joined to the ball 42. The ball 42 may also have a male threaded stud 50 inserted into the bore 44, as depicted in FIGS. 1–4, thereby permitting the use of a shaft or hydraulic cylinder having a female threads. Obviously the use of the stud 50 is optional, depending upon the application of the invention. It may be plainly seen that the recess 48, the bore 44 along with the stud 50 comprises the integral attaching means for the ball 42.

In order to complete the lubrication means for the invention, the ball 42 further includes a plurality of grooves 36 which are cut into the ball in a similar manner as the grooves 36 in the case socket 28. The grooves 36 provide a flowpath for the grease inserted between the ball 42 and the socket 28. Again, the number or size of grooves 36 is not important nor is their location, as long as they intersect with the grooves in mating part at some point in their rotational orbit.

A hollow socket cap 52, as shown in FIGS. 5 and 6, having a top 54 and a bottom 56, is preferably machined of metal and includes an opening 58 located completely through the top which exposes a portion of the ball 42. The cap 52 is preferably found and has a plurality of female threads 60 cut into a cavity 62 that is located within the bottom 56 of the cap 52. The cap 52 includes a radial surface 64 between the opening 58 and the cavity 62 corresponding to the radius of the ball 42, thus permitting the ball and cap to have a slip fit therebetween. The female threads 60 mate with the male threads 30 in the case 20, thereby captivating the ball 42 within the case 20 while allowing the ball to rotate within the confines of the opening 58 in the cap 52 and the workpiece attached to the ball. The ball 42 protrudes above the socket cap 52 from 70 to 80 percent of the ball's true radius in order to permit orbiting of the ball upon its rotational axis, therefore restricted only by its geometrical limitations.

To augment the removability of the ball 42 from the case 20, the outside periphery of the cap 52 is optionally knurled 66, as illustrated in FIG. 5. The knurling 66 provides secure gripping of the cap 52 when manually screwed on or off, particularly when there is lubricating grease present.

The ball joint may be attached to an automotive axle, piece of machinery, floor or the like by welding or bolting the case 20 securely in place onto the natural surface or with a spacer plate in between. The cap 52 is slipped over a workpiece, such as a shaft, hydraulic cylinder, table leg, etc. and the ball 42 is attached into the threaded bore 44 with the workpiece or the stud 50 as applicable. The ball 42 with the stud 50 attached is inserted into the socket 28 ;and the cap 52 is threaded into place upon the case 20. Grease is introduced into the lubricating means using conventional equipment through the grease fitting 40, which penetrates into a fissure region or spatial pathway that is located between the ball 42, the case 20 and the cap 52, thereby reducing friction and allowing free movement within the geometry of the ball joint.

FIG. 12 illustrates a typical application of the invention on a floating table 68, such as a portable stage that is mounted on an irregular surface. The invention with the ball attached to a hydraulic cylinder 70 and the case welded to the axle 32 of a vehicle is depicted in FIG. 13. A machine tool such as a lathe 72 is also a good candidate for the ball joint and is shown in FIG. 14. FIG. 15 illustrates another application with a pair of ball joints mounted on respective outrigger legs 74, such as on an earth moving vehicle, crane or backhoe.

While the invention has been described in complete detail and pictorially shown in the accompanying drawings, it is not to be limited to such details, since many changes and modifications may be made in the invention without departing from the spirit and scope thereof. For example, the ball, socket case and socket cap can be machined from any high strength, high durability material including steel, ceramic, or a composite material. Hence, it is described to cover any and all modifications and forms which may come within the language and scope of the appended claims.

What is claimed is:

1. A base mounted lubricated ball joint comprising;
   a) a hollow socket one piece case having a top, a bottom and sides with a spherical socket integrally formed within the case and a plurality of radial male threads cut into the side at right angles to the top,
   b) a solid ball having attaching means integral therewith, disposed rotatably within the spherical socket of the case, said ball having a female threaded bore in a central position within the ball for receiving a male threaded shaft,
   c) a hollow circular socket cap having a top and a bottom, said top having an opening therein for exposing a portion of the ball, also the cap having a plurality of female threads cut into a cavity within the bottom of the cap, said cap attached to the case with the female cap threads interfacing with the male case threads thereby captivating the ball in a removable manner, and
   d) lubrication means, defined as grease, integral with the case and ball for reducing friction between the ball, cap and case when the ball is rotated within the confines of the joint.

2. A base mounted lubricated ball joint comprising:
   a) a hollow socket case having a top, a bottom and sides with a spherical socket integrally formed within the case and a plurality of radial male threads cut into the side at right angles to the top,
   b) a ball having attaching means integral therewith, disposed rotatably within the spherical socket of the case, said ball further having female threaded bore in a central position within the ball, for receiving a male threaded shaft and a flat portion adjacent to and at right angles to the threaded bore also a recess within the flat portion, for receiving a shaft in its interior, augmenting strength of a connection when a shaft is threadably joined to the ball,
   c) a hollow socket cap having a top and a bottom, said top having an opening therein for exposing a portion of a ball, also the cap having a plurality of female threads cut into a cavity within the bottom of the cap, said cap attached to the case with the female cap threads interfacing with the male case threads thereby captivating the ball in a removable manner, and
   d) lubrication means integral with the case and ball for reducing friction between the ball, cap and case when the ball is rotated within the confines of the joint.

3. The base-mounted lubricated ball joint as recited in claim 1 wherein said ball further comprises a male threaded stud disposed within the ball for attachment of external elements to the ball joint.

4. The base-mounted lubricated ball joint as recited in claim 1 wherein said socket case bottom is configured to be welded onto a workpiece for attachment thereupon.

5. The base-mounted lubricated ball joint as recited in claim 1 wherein said socket case further having a plurality of mounting holes therethrough such that the case may be bolted onto a workpiece for attachment therewith.

6. The base-mounted lubricated ball joint as recited in claim 5 wherein said mounting holes are threaded for attachment to a workpiece with threaded fasteners.

7. A base mounted lubricated ball joint comprising:
   a) a hollow socket case having a top, a bottom and sides with a spherical socket integrally formed within the case and a plurality of radial male threads cut into the side at right angles to the top,
   b) a ball having attaching means integral therewith, disposed rotatably within the spherical socket of the case, said ball further having a plurality of grooves positioned within a lower portion of the ball, and, said socket case further having a plurality of grooves recessed in the spherical socket, said case also having a orifice therethrough in alignment with at least one of the grooves and a grease fitting disposed within the orifice for introducing grease into a fissure region defining a spatial pathway between the ball, case and cap thus permitting insertion of lubricating grease into the joint,
   c) a hollow socket cap having a top and a bottom, said top having an opening therein for exposing a portion of the ball, also the cap having a plurality of female threads cut into a cavity within the bottom of the cap, said cap attached to the case with the female cap threads interfacing with the male case threads thereby captivating the ball in a removable manner, and
   d) lubrication means integral with the case and ball for reducing friction between the ball, cap and case when the ball is rotated within the confines of the joint. female threads cut into a cavity within the bottom of the cap, said cap attached to the case with the female cap threads interfacing with the male case threads thereby captivating the ball in a removable manner, and d) lubrication means, defined as grease, integral with the case and ball for reducing friction between the ball, cap and case when the ball is rotated within the confines of the joint.

8. The base-mounted lubricated ball joint as recited in claim 7 wherein said grease fitting is the standard drive type.

9. The base-mounted lubricated ball joint as recited in claim 7 wherein said grease fitting is the self tapping spin drive type.

* * * * *